US012600610B2

(12) United States Patent
Ramos

(10) Patent No.: US 12,600,610 B2
(45) Date of Patent: Apr. 14, 2026

(54) DUAL PROPANE CYLINDER ATTACHMENT FOR FORKLIFT

(71) Applicant: Jose Natanael Ramos, Desoto, TX (US)

(72) Inventor: Jose Natanael Ramos, Desoto, TX (US)

(*) Notice: Subject to any disclaimer, the term of this patent is extended or adjusted under 35 U.S.C. 154(b) by 0 days.

(21) Appl. No.: 18/922,083

(22) Filed: Oct. 21, 2024

(65) Prior Publication Data

US 2025/0171287 A1 May 29, 2025

Related U.S. Application Data

(63) Continuation-in-part of application No. 18/523,861, filed on Nov. 29, 2023, now abandoned.

(51) Int. Cl.
*B66F 9/18* (2006.01)
*A47B 81/00* (2006.01)
*E05B 73/00* (2006.01)

(52) U.S. Cl.
CPC ............ *B66F 9/187* (2013.01); *A47B 81/007* (2013.01); *E05B 73/00* (2013.01)

(58) Field of Classification Search
CPC ....... B66F 9/187; A47B 81/007; A47B 73/00; A47B 81/00; A47B 81/005; A47B 55/00; A47B 57/04; A47B 57/06; A47B 57/18; A47B 57/30; A47B 57/44; A47B 47/00; A47B 47/02; A47B 47/021; A47B 47/027; A47F 7/28; A47F 7/281; A47F 7/283; B60P 7/06; E05B 73/00
See application file for complete search history.

(56) References Cited

U.S. PATENT DOCUMENTS

| | | | | | |
|---|---|---|---|---|---|
| 607,214 | A * | 7/1898 | Carroll | A47F 5/01 | 414/789.5 |
| 2,173,152 | A * | 9/1939 | Bauer | A47F 7/28 | 211/49.1 |
| 2,539,233 | A * | 1/1951 | Dickson | B66F 9/187 | 414/622 |
| 2,545,021 | A * | 3/1951 | Coupland | B66F 9/187 | 414/622 |
| 2,558,216 | A * | 6/1951 | Hawkinson | B66F 9/187 | 294/87.1 |
| 2,581,364 | A * | 1/1952 | Cushman | B66F 9/187 | 24/523 |

(Continued)

OTHER PUBLICATIONS

Non Final Office Action in Related Parent U.S. Appl. No. 18/523,861, 7 Pages.

*Primary Examiner* — Devin K Barnett
(74) *Attorney, Agent, or Firm* — Law Office of Jeff Williams PLLC; J. Oliver Williams

(57) ABSTRACT

A tank carrier includes a base member, a backstop, and a pair of support members. The pair of support members extend between the base member and the backstop to form an angled support to solidify an orientation between the base member and the backstop. A lower saddle strap and an upper saddle strap each extend between the pair of support members and are configured to separate from each other between the plurality of support members to extend around a tank. A latch, having a pin, is configured to selectively secure the upper saddle strap to at least one of the pair of support members.

20 Claims, 3 Drawing Sheets

(56) References Cited

U.S. PATENT DOCUMENTS

| | | | | | |
|---|---|---|---|---|---|
| 2,728,488 | A * | 12/1955 | Hankins | F16N 33/00 | 141/330 |
| 3,104,778 | A * | 9/1963 | Leonard | A47F 5/01 | 221/45 |
| 3,192,970 | A * | 7/1965 | Allen | F16N 33/00 | 211/150 |
| 3,677,562 | A * | 7/1972 | Bronstein | B60P 7/15 | 410/97 |
| 4,998,629 | A * | 3/1991 | Cheng | G07F 11/62 | 211/74 |
| 5,259,524 | A * | 11/1993 | Eckert | B65D 71/50 | 206/597 |
| 5,898,378 | A * | 4/1999 | Berg | B66F 9/187 | 414/607 |
| 6,254,052 | B1 * | 7/2001 | Hubbard | F24H 9/06 | 248/225.11 |
| 6,435,588 | B1 * | 8/2002 | Bauer | B60P 1/435 | 296/61 |
| 6,685,153 | B2 * | 2/2004 | Foreman | F24H 9/06 | 248/505 |
| 6,685,404 | B2 * | 2/2004 | Udivich | B60P 7/12 | 410/32 |
| 7,914,016 | B2 * | 3/2011 | Guttormson | B62B 1/264 | 211/74 |
| 9,532,665 | B1 * | 1/2017 | Selby | B65H 49/325 | |
| 9,586,803 | B1 * | 3/2017 | Snyker | B67D 3/0029 | |
| 9,635,940 | B2 * | 5/2017 | Letham | A47B 95/008 | |
| 10,718,469 | B2 * | 7/2020 | Sloan | F17C 13/08 | |
| 12,193,579 | B1 * | 1/2025 | González | A47B 81/007 | |
| 2006/0006303 | A1 * | 1/2006 | Bernhard | B66F 9/07518 | 248/311.2 |
| 2012/0318763 | A1 * | 12/2012 | Garton | B65D 71/70 | 211/85.22 |
| 2013/0259618 | A1 * | 10/2013 | McGrane | B66F 9/143 | 414/671 |
| 2019/0239642 | A1 * | 8/2019 | Culverson | A47B 96/14 | |
| 2019/0276188 | A1 * | 9/2019 | Kartika | B32B 27/08 | |
| 2019/0366906 | A1 * | 12/2019 | Brooks | B60P 7/12 | |
| 2019/0380491 | A1 * | 12/2019 | Ehrgott | A47B 81/007 | |
| 2022/0002127 | A1 * | 1/2022 | O'Shaughnessy | B66F 9/18 | |
| 2023/0157448 | A1 * | 5/2023 | Willnow | A47F 7/281 | 211/85.18 |
| 2023/0389704 | A1 * | 12/2023 | Ratermann | A47B 97/00 | |
| 2024/0268554 | A1 * | 8/2024 | Willnow | B60P 7/12 | |
| 2025/0228364 | A1 * | 7/2025 | Willnow | B60P 7/12 | |

* cited by examiner

DUAL PROPANE CYLINDER ATTACHMENT FOR FORKLIFT

CROSS REFERENCE TO RELATED APPLICATIONS

This application is a Continuation in Part of and claims the benefit of an earlier filing date and right of priority to U.S. application Ser. No. 18/523,861, filed 29 Nov. 2023, the contents of which is incorporated by reference herein in its entirety.

BACKGROUND OF THE INVENTION

1. Field of the Invention

The present application relates to a propane tank carrier.

2. Description of Related Art

Propane is commonly used for domestic and industrial applications and low-emission public transportation. The gas has become popular due to its low boiling point, which causes it to vaporize inside pressurized liquid containers. Propane retains its ability to vaporize even in cold weather, making it ideal for outdoor use. Propane is very popular for use in barbecue equipment and portable stoves and heaters.

The use of propane for industrial devices such as buses, forklifts, automobiles, and outboard motors has become increasingly popular. Motorhomes, recreational vehicles, and campers often use propane for heating and cooking. The wide use of propane, with its efficiency, storage capabilities, and portability, has become a fuel of choice among many industries and homes.

The inherent dangers of propane lie in its flammability, which is the very thing that makes it popular. The storage tank, if damaged, can be hazardous. Carrying around a propane tank in areas where it may be subject to damage can threaten workers and individuals with uncontrolled fire or, worse, an explosion. An exhausted propane tank is still dangerous due to residual vapors, and a full tank has excellent potential to harm. Dealing with propane tanks can be difficult because of the weight involved. The heavy steel tank is difficult to handle, and the larger the tank, the more it weighs and the more potential for disaster. Although strides have been made, shortcomings remain.

BRIEF SUMMARY OF THE INVENTION

It is an object of the present application to provide a tank carrier system that is compatible with tanks. It is understood that the tanks may be propane tanks wherein the contents are flammable and therefore require extra precaution, but may be used with tanks holding any solid, liquid or gas. The system of the present application is configured to provide a portable platform for the transportation and storage of tanks.

It is a further object of the present application that the tanks are protected from any lifting device that is used to lift and move the system. It is another object of the system to permit interchangeability of the tanks and individually release and secure each tank as needed.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated.

Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
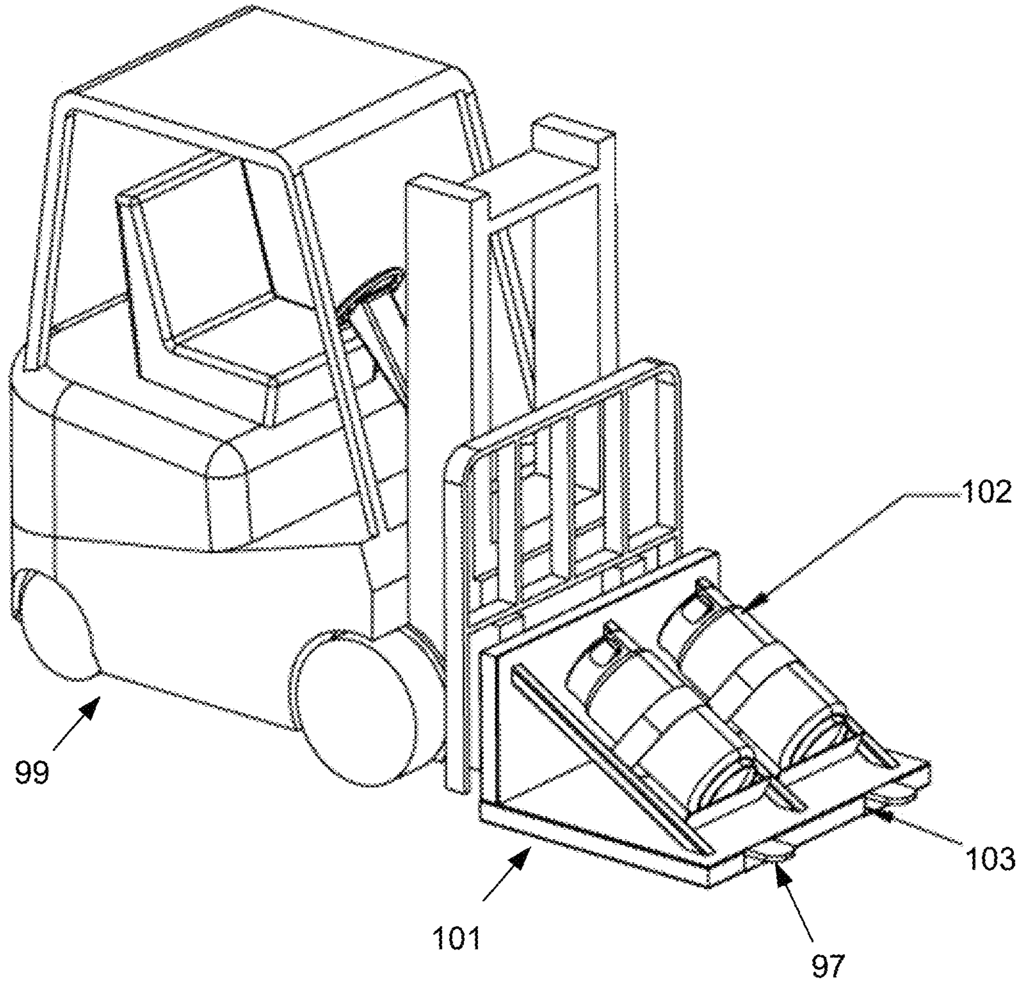
FIG. 1 is a perspective view of a tank carrier system according to an embodiment of the present application.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method in accordance with the present application overcomes one or more of the above-discussed problems commonly associated with the prior art discussed previously. In particular, the tank carrier system is a specialized pallet-based platform for transporting two propane tanks. This is a robust and practical solution for safe and efficient handling. Constructed from heavy-duty materials, it features secure slots and straps specifically shaped to hold the tanks in place, preventing any movement or rolling during transit. The design also protects the tanks from accidental damage from the forks of the forklift. Its design includes forklift access points, allowing for easy lifting and maneuvering by warehouse machinery. With its durable build and thoughtful features, this pallet streamlines the transportation of propane tanks, significantly reducing the risk of accidents and facilitating operational workflow. These and other unique features are discussed below and illustrated in the accompanying drawings.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The embodiments and method of the present application is illustrated in the associated drawings. The dual propane carrier or attachment is illustrated in a typical in-use scenario. It is designed to carry a plurality of large propane tanks and is configured to be lifted and carried by a forklift or other large equipment. The unit aids in transporting and warehouse operations of full or empty propane tanks. The attachment eliminates long walks carrying heavy propane tanks to storage areas such as warehouse backyards. It also increases the safety of employees handling the propane tanks by preventing damage and resulting explosions or fires due to unsafe handling of the tanks. The attachment is also efficient and reduces the time needed to transport and handle propane tanks. Additional features and functions are illustrated and discussed below.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

Referring now to FIG. 1 in the drawings, a perspective view of a propane tank attachment is illustrated. The propane tank attachment is configured to transport a plurality of propane tanks in a safe manner. It is ideally suited for application with large equipment for the purpose of storing and transporting. It is understood that any number of large propane tanks maybe suitable for use with the present attachment. For purposes herein, a dual tank configuration will be presented which will illustrate the various components necessary for secure transportation and storage.

As seen in FIG. 1, attachment 101 is configured for use with a forklift 99. Forklift 99 is configured to pass through a portion of attachment 101 for the purpose of lifting and hauling. Attachment 101 includes channels 103 that are formed and located so as to fit with customary forks 97 used with large machinery, such as forklift 99. As illustrated in FIG. 1, two 80 LB propane tanks 102 are illustrated at an inclined angle within attachment 101.

Dual propane tank carrier/attachment 101 includes a base member 105 along with a backstop 107 that are held at a designated angle relative to one another with support member 109. Base member 105 is configured to include an upper surface 106 and a lower surface separated so as to create or form channels 103. Channels 103 are spaced from one another so as to facilitate acceptance of forks 97. In operation a user or operator merely aligns forks 97 with channels 103 and inserts forks 97 therein. Forks 97 are then usable to lift attachment 101 from the ground for transportation.

Backstop 107 is situated along a rear edge of base member 105. Ideally backstop 107 is perpendicular to the upper surface of base member 105 but is not so limited to such a limitation. Other angles are possible. Support member 109 extends from the upper surface of base member 105 and a forward surface of backstop 107 so as to act as a brace and structural support. It is understood that backstop 107 may include a steel vertical plate along the forward surface. Support member 109 is configured to secure the relative orientation between backstop 107 and base member 105 as well as provide support for the cradling or holding of tanks 102.

Figure 2:
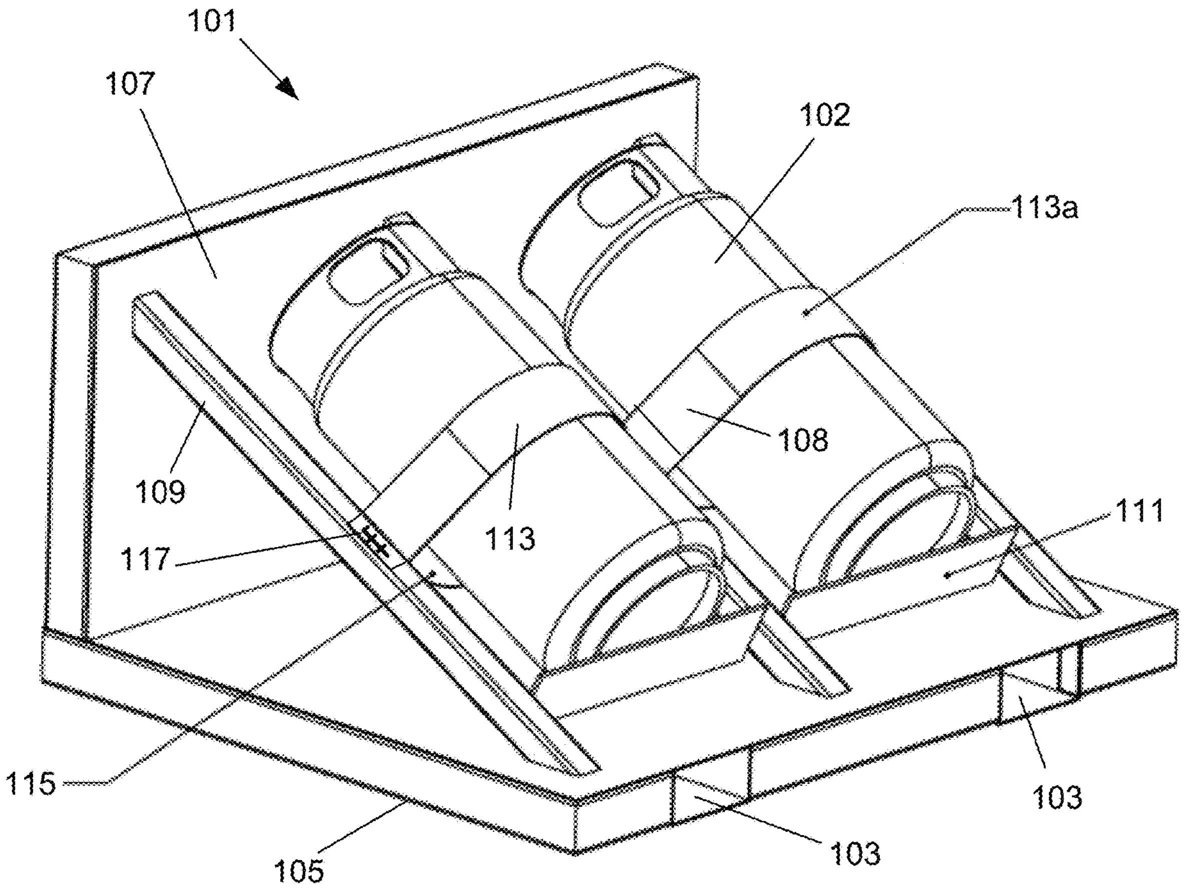
FIG. 2 is an enlarged perspective view of the system of FIG. 1.

Support member 109 includes a kick plate 111 configured to extend between adjacent support members 109. It is understood that attachment 101 may include a plurality of support members 109, the number of which is dependent upon the number of tanks 102 to be supported. A support member 109 is ideally situated to be on either side of an individual tank 102. As seen in FIG. 2 of the drawings, one of the support members 109 is situated between two adjacent tanks 102. As such it is used for support of both adjacent tanks as opposed to the outer support members 109 which are used for only supporting a single tank. Kick plate 111 is situated adjacent to the upper surface of base member 105 extending between neighboring support members 109. The purpose of kick plate 111 is to support and contact a lower end of tank 102 so as to prevent the tank from undesirably translating or sliding when cradled.

Attachment 101 further includes saddle straps, namely upper saddle straps 113 and lower saddle straps 115. Both upper and lower saddle straps 113 and 115 are configured to surround the central body of tank 102 and secure them to support members 109. Securing them in this manner prevents them from bouncing or translating off of attachment 101 during transportation or storage. Both saddle straps 113 and 115 are selectively coupled to support members 109 on either side of each tank 102. The saddle straps are configured to be formed to the diameter and size of the tanks being transported within attachment 101. In this manner, the saddle straps may be formed from a rigid material configured to hold or maintain its partially cylindrical form. It is understood that saddle straps 113 and 115 may be interchangeable so as to adjust to different tank sizes. Conversely, it is understood that the saddle straps may be formed from a flexible material that are configured to selectively conform to the size of tank 102. This capable ability would allow the saddle straps to adjust to the size of the tanks.

It is recognized that rigidly formed saddle straps would operate better in maintaining the strict positioning of tanks 102 within attachment 101. Where saddle straps are flexible in nature, selective bumps or sudden movements during transportation may create situations where tanks 102 may jostle or shift. To combat this from happening, the saddle straps may include a tightener 108 to allow them to compress around the sides of the tank 102. This tightener 108 may be nothing more than a hook and loop fastener configured to selectively lengthen or shorten a particular saddle strap. It is recognized that any flexible set saddle strap may include tightener 108. FIG. 2 illustrates upper saddle strap 113*a* inclusive of tightener 108 wherein the upper saddle strap 113*a* is flexible in nature. The other saddle strap 113 is a rigidly formed saddle strap. It is understood that rigid and non rigid forms of the saddle straps 113/115 may be used together on a singular tank 102. For simplicity purposes herein, discussion of upper saddle strap 113 and 113*a* will be referenced together as represented merely by saddle strap 113 except as otherwise noted.

Figure 3:
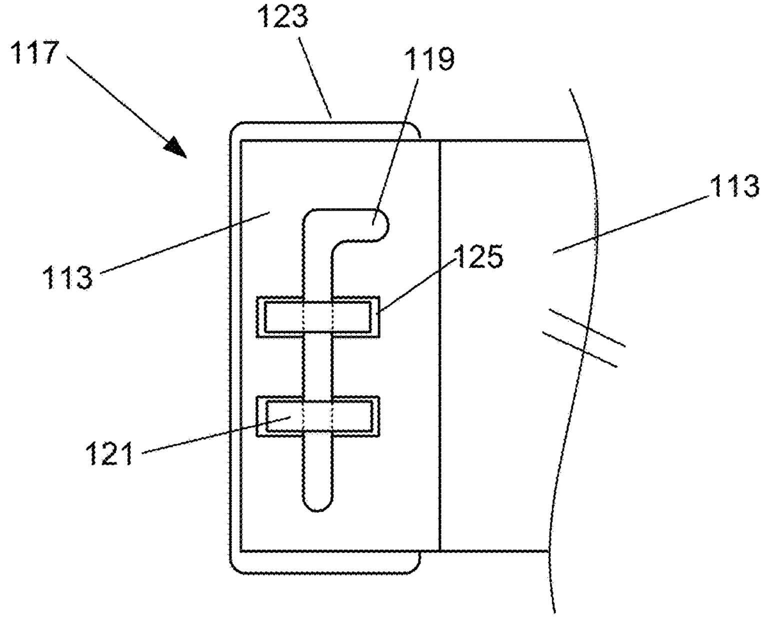
FIG. 3 is a top view of a latch used in the system of FIG. 1.

Referring now also to FIG. 3 in the drawings, a top view of latch 117 is illustrated. Latch 117 is configured to selectively permit the engagement of saddle straps 113 and 115 with support member 109. Latch 117 is used to lock and unlock the propane cylinders within their respective saddles. It is understood that latch 117 may operate with an individual saddle strap 113 and 115. Alternatively, latch 117 may operate collectively with both saddle strap 113 and 115 at a singular location. It is understood that operation of latch 117 is selectively configured to release at least one of upper strap 113 and lower strap 115 so as to facilitate removal or access to propane tanks 102.

From FIG. 3, a more enlarged view of latch 117 is provided so as to bring greater clarity to its operation. It is understood that latch 117 may operate in various different manners of which are not necessarily depicted. It is understood that latch 117, may include a pin 119 that is configured to selectively translate or pass through a portion of the saddle straps or a coupled member of support member 109 such that it secures the saddle straps in place. In the embodiment depicted in FIG. 3, latch 117 includes pin 119 which is configured to pass through tabs 121 coupled to members 109. Tabs 121 extend upward away from a surface of support member 109 and includes an aperture there through for acceptance of pin 119.

To facilitate better manufacturing and ease of assembly, latch 117 may include a plate 123 to which tabs 121 are securely coupled. Plate 123 may then be secured separately to support members 109. Saddle straps 113 and 115 are selectively configured to include an aperture 125 configured to align with tabs 121. In operation, pin 119 passes through an aperture in tabs 121. The saddle straps are situated between plate 123 and pin 119. It is understood that pin 119 is configured to pass through at least one aperture in tabs 121. Removal of pin 119 permits lifting of the saddle straps away from support member 109 for removal. Again, it is understood that the saddle straps may be shared with a singular pin 119 or latch 117 or attachment 101 may include separate latches 117 for each saddle strap.

The saddle straps are removable from each individual support member 109 or alternatively maybe secured to any one of the support members 109. As an example, saddle strap 115 may be securely fastened to support members 109 such that latch 117 is not necessary on any support member 109. In this manner, the lower saddle strap 113 is not removable. A disadvantage of this configuration is that the curvature or shape of lower saddle strap 115 is not adjustable such that that particular embodiment of attachment 101 is therefore limited to a particular sized tank diameter. In a different example, the saddle straps may be hinged so as to pivot at one end thereby necessitating only a singular latch 117 in operation. In this example upper saddle strap 115 may be hinged along a singular support member 109 well a second distal end of saddle strap 115 maybe releasably secured at a second support member 109 with latch 117. A similar disadvantage exists in this configuration as the upper saddle strap 113 is not necessarily interchangeable to allow operation with different sized tank diameters. It is evident that the greatest functionality and diversity of attachment 101 would allow the saddle straps to be fully removed and interchangeable. Latches 117 are ideally suited to provide simple and effective operation to securely the saddle straps in position. It is even understood that latches 117 may include a spring to operate with pin 119 so as to provide an automatic latching position for pin 119.

Figure 4:
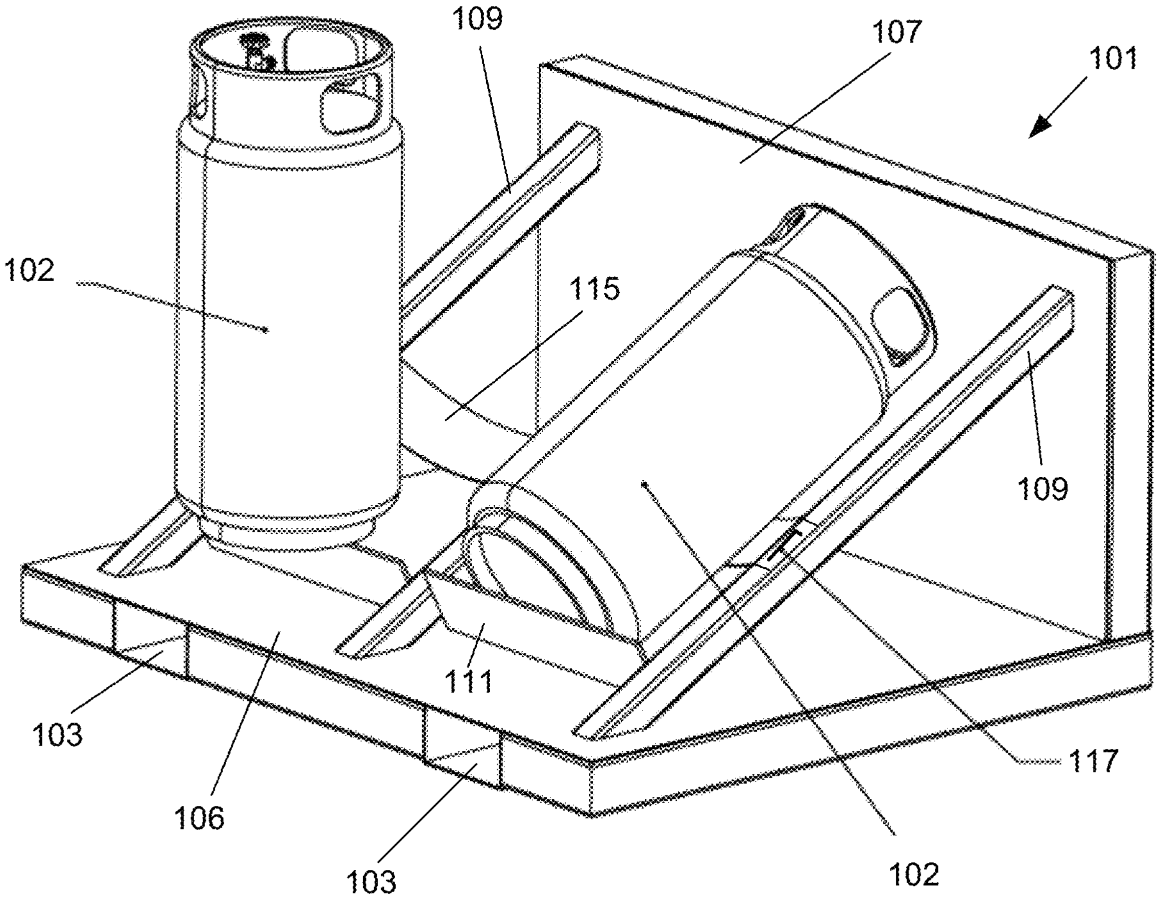
FIG. 4 is an alternate perspective view of the system of FIG. 2 with a tank removed.

Referring now also to FIG. 4 in the drawings, an alternate perspective view of attachment 101 is provided. In this view the upper saddle straps 113 are removed to allow tanks 102 to be repositioned. A singular tank 102 is elevated and resting on kick plate 111. Saddle straps 115 may be replaced with different saddle straps formed to have a different diameter for acceptance of a different tank 102. It is understood that the materials of attachment 101 are to be made from durable strong materials such as metallic or composites, even wood materials.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A tank carrier, comprising:

a base member;

a backstop coupled to the base member;

a pair of support members extending between the base member and the backstop to form an angled support to solidify an orientation between the base member and the backstop;

a lower saddle strap and an upper saddle strap each configured to extend between the pair of support members, the lower saddle strap and the upper saddle strap being configured to separate from each other between the pair of support members; and at least one latch having a pin, the at least one latch is configured to selectively secure the upper saddle strap to at least one of the pair of support members;

wherein the at least one latch is configured to also secure the lower saddle strap to the at least one of the pair of support members.

2. The carrier of claim 1, wherein each of the pair of support members is configured to be latched.

3. The carrier of claim 1, wherein the upper saddle strap is fully removable from the pair of support members.

4. The carrier of claim 1, wherein the lower saddle strap is fully removable from the pair of support members.

5. The carrier of claim 4, wherein the upper saddle strap is fully removable from the pair of support members.

6. The carrier of claim 1, wherein at least one of the lower saddle strap and the upper saddle strap is rigidly formed to a particular diameter.

7. The carrier of claim 1, wherein at least one of the lower saddle strap and the upper saddle strap is flexible to adapt in size and shape.

8. The carrier of claim 7, wherein the at least one of the lower saddle strap and the upper saddle strap is configured to include a tightener configured to adjust a length of the respective saddle strap.

9. The carrier of claim 1, further comprising:

a kick plate extending between the pair of support members adjacent to the base member.

10. A method of securing a tank, comprising:

obtaining a tank carrier of claim 1;

locating the tank against a kick plate extending between the pair of support members, the kick plate in contact with a lower surface of the tank to prevent translation of the tank;

cradling the tank on the lower saddle strap;

securing the tank in the lower saddle strap by securing an upper saddle strap around the tank;

wherein the lower saddle strap and the upper saddle strap are configured to extend around opposing sides of the tank so as to restrict motion; and activating a respective latch from the at least one latch to hold the upper saddle strap to at least one of the pair of support members.

11. The method of claim 10, wherein each of the pair of support members is configured to be latched.

12. The method of claim 10, wherein the upper saddle strap is fully removable from the pair of support members.

13. The method of claim 10, wherein the lower saddle strap is fully removable from the pair of support members.

14. The method of claim 10, wherein at least one of the lower saddle strap and the upper saddle strap is rigidly formed to a particular diameter of the tank.

15. The method of claim 10, wherein at least one of the lower saddle strap and the upper saddle strap is flexible to adapt to a size and shape of the tank.

16. The method of claim 10, further comprising:

adjusting a tightener in communication with at least one of the lower saddle strap and the upper saddle strap to compress around the tank.

17. A tank carrier, comprising:

a base member;

a backstop coupled to the base member;

a pair of support members extending between the base member and the backstop to form an angled support to solidify an orientation between the base member and the backstop;

a lower saddle strap and an upper saddle strap each configured to extend between the pair of support members, the lower saddle strap and the upper saddle strap being configured to separate from each other between the pair of support members; and at least one latch having a pin, the at least one latch is configured to selectively secure the upper saddle strap to at least one of the pair of support members;

wherein at least one of the lower saddle strap and the upper saddle strap is rigidly formed to a particular diameter.

18. The carrier of claim 17, wherein the upper saddle strap is fully removable from the pair of support members.

19. The carrier of claim 17, wherein the lower saddle strap is fully removable from the pair of support members.

20. The carrier of claim 17, further comprising:

a kick plate extending between the pair of support members adjacent to the base member.

* * * * *